United States Patent
Banwell et al.

(10) Patent No.: US 8,693,875 B2
(45) Date of Patent: Apr. 8, 2014

(54) METHOD AND APPARATUS FOR OPTIMIZED ANALOG RF OPTICAL LINKS

(75) Inventors: Thomas Banwell, Howell, NJ (US);
Anjali Agarwal, Matawan, NJ (US);
Paul Toliver, Tinton Falls, NJ (US); Ted K. Woodward, Holmdel, NJ (US)

(73) Assignee: Applied Communications Sciences, Basking Ridge, NJ (US)

( * ) Notice: Subject to any disclaimer, the term of this patent is extended or adjusted under 35 U.S.C. 154(b) by 271 days.

(21) Appl. No.: 12/621,863

(22) Filed: Nov. 19, 2009

(65) Prior Publication Data

US 2012/0315049 A1  Dec. 13, 2012

Related U.S. Application Data

(60) Provisional application No. 61/116,468, filed on Nov. 20, 2008, provisional application No. 61/155,285, filed on Feb. 25, 2009.

(51) Int. Cl.
*H04B 10/00* (2013.01)

(52) U.S. Cl.
USPC ............ 398/115; 398/183; 398/193; 398/194

(58) Field of Classification Search
USPC .......................... 398/115–117, 182, 192, 193
See application file for complete search history.

(56) References Cited

U.S. PATENT DOCUMENTS

| | | | | |
|---|---|---|---|---|
| 5,253,309 A | * | 10/1993 | Nazarathy et al. | 385/4 |
| 5,274,381 A | * | 12/1993 | Riza | 342/368 |
| 5,359,412 A | * | 10/1994 | Schulz | 356/478 |
| 5,373,383 A | * | 12/1994 | LaGasse | 398/26 |
| 5,450,223 A | * | 9/1995 | Wagner et al. | 398/121 |
| 5,485,009 A | * | 1/1996 | Meyzonnetie et al. | 356/5.09 |
| 5,917,636 A | * | 6/1999 | Wake et al. | 398/182 |
| 5,940,196 A | * | 8/1999 | Piehler et al. | 398/91 |
| 5,963,567 A | * | 10/1999 | Veselka et al. | 372/21 |
| 6,115,162 A | * | 9/2000 | Graves et al. | 398/116 |
| 6,137,612 A | * | 10/2000 | Startup | 398/199 |
| 6,188,808 B1 | * | 2/2001 | Zhou et al. | 385/3 |
| 6,201,638 B1 | * | 3/2001 | Hall et al. | 359/346 |
| 6,246,500 B1 | * | 6/2001 | Ackerman | 398/115 |
| 6,359,716 B1 | * | 3/2002 | Taylor | 398/212 |
| 6,535,165 B2 | * | 3/2003 | Stephens | 342/375 |
| 6,563,622 B2 | * | 5/2003 | Mueller et al. | 398/182 |

(Continued)

OTHER PUBLICATIONS

Cox, C., et. al., "Limits on the Performance of RF-over-fiber Links and Their Impact on Device Design." IEEE Transactions on Microwave Theory and Techniques, vol. 54, No. 2, Feb. 2006, p. 906-920.

(Continued)

*Primary Examiner* — Agustin Bello
(74) *Attorney, Agent, or Firm* — Lowentstein Sandler LLP

(57) ABSTRACT

A system and method for optimizing an optical RF photonic link system is presented. The system comprises a modulator subsystem in which nonlinear response is compensated by an envelope precompensation method and employs an optical filter to suppress optical carriers and extract modulated sidebands, an optical amplifier, and an array of photodetectors, each having a plurality of pairs of diodes. The modulator subsystem performs optical filtering on the signal, the signal is amplified by the optical amplifier and sent to the array of photodetectors. The optical amplifier can be an erbium doped fiber amplifier, or a phase sensitive amplifier. The optical power can be delivered to each diode of the array of photodetectors via a photonic integrated circuit.

15 Claims, 13 Drawing Sheets

(56) References Cited

U.S. PATENT DOCUMENTS

| | | | | |
|---|---|---|---|---|
| 6,597,836 | B2* | 7/2003 | Johnson et al. | 385/33 |
| 6,634,811 | B1* | 10/2003 | Gertel et al. | 398/159 |
| 6,724,523 | B2* | 4/2004 | Yap | 359/333 |
| 6,804,471 | B1* | 10/2004 | Ionov et al. | 398/187 |
| 6,901,224 | B1* | 5/2005 | Davis | 398/202 |
| 7,006,726 | B2* | 2/2006 | Hayes | 385/27 |
| 7,057,716 | B2* | 6/2006 | Yap | 356/141.5 |
| 7,079,780 | B1* | 7/2006 | Rollins | 398/198 |
| 7,245,833 | B1* | 7/2007 | Volkening | 398/116 |
| 7,266,269 | B2* | 9/2007 | Koste et al. | 385/40 |
| 7,302,185 | B2* | 11/2007 | Wood et al. | 398/115 |
| 7,369,722 | B2* | 5/2008 | Yilmaz et al. | 385/27 |
| 7,369,779 | B1* | 5/2008 | Croussore et al. | 398/176 |
| 7,421,168 | B1* | 9/2008 | Goutzoulis | 385/50 |
| 7,477,852 | B2* | 1/2009 | Agarwal et al. | 398/210 |
| 7,486,247 | B2* | 2/2009 | Ridgway et al. | 343/767 |
| 7,649,495 | B2* | 1/2010 | Stephens | 342/375 |
| 7,657,132 | B1* | 2/2010 | Yap et al. | 385/10 |
| 7,660,491 | B2* | 2/2010 | Thaniyavarn | 385/3 |
| 7,898,464 | B1* | 3/2011 | Anderson et al. | 342/54 |
| 8,027,588 | B2* | 9/2011 | Kim et al. | 398/92 |
| 8,059,969 | B1* | 11/2011 | Yap | 398/183 |
| 8,103,175 | B1* | 1/2012 | Kowalczyk et al. | 398/200 |
| 2009/0263137 | A1* | 10/2009 | Hossein-Zadeh et al. | 398/115 |
| 2009/0297155 | A1* | 12/2009 | Weiner et al. | 398/115 |
| 2010/0247104 | A1* | 9/2010 | Yu et al. | 398/115 |

OTHER PUBLICATIONS

Darcie, T., et. al., "Demonstration of a Class-B Microwave-photonic Link Using Optical Frequency Modulation and Complementary Fiber Bragg Grating Discriminators." Optical Fiber Communication Conference, Mar. 5-10, 2006, p. 1-3.

Ramaswamy, A., et. als., "Integrated Coherent Receivers for High-Linearity Microwave Photonic Links." Journal of Lightwave Techology, vol. 26, No. 1, Jan. 1, 2008, p. 209-216.

Li, Y., et, al., "Novel Attenuation-Counter-Propagating Phase Modulator for Highly Linear Fiber-Optic Links." Journal of Lightwave Techology, vol. 24, No. 10, Oct. 2006, p. 3709-3718.

Little, B. et. al., "Tunable Narrow Band Filters for RF Photonics." IEEE Conference on Avionics, Fiber-Optics and Photonics, Annapolis, MD, Sep. 12-14, 2006, p. 48-49.

Agarwal, A., et. als., "Fully Programmable Ring-Resonator-Based Integrated Photonic Circuit for Phase Coherent Applications." Journal of Lightwave Technology, vol. 24, No. 1, Jan. 2006, p. 77-87.

Tulchinsky, D., et. al., "High-Current Photodetectors as Efficient, Linear, and High-Power RF Output Stages." Journal of Lightwave Techology, vol. 26, No. 4, Feb. 15, 2008, p. 408-416.

Duan, N., et. al., "An InGaAs / InP Photodiode with 600 mW RF Output Power." 2006 Digest of the LEOS Summer Topical Meetings, 2006, Paper WD2.3, p. 52-53.

Marhic, M., et. al., "Wide-Band Tuning of the Gain Spectra of One Pump Fiber Optic Parametric Amplifier." IEEE Journal of Selected Topics in Quantum Electronics, vol. 10, No. 5, 2004, p. 1133-1141.

Eggleton, B., et. als., "Chalcogenide Glass, Advanced for All-Optical Processing." Photonics Spectra, Sep. 2007.

Andersen, T., et als., "Continuous-wave Wavelength Conversion in a Photonic Crystal Fiber with Two Zero Dispersion Wavelengths: Erratum." Optics Express, vol. 13, No. 9, 2005, p. 3581-3590.

Lee, J., et als., "Bismuth Oxide Based nonlinear Fiber with a High SBS Threshold and its Application to Four Wave Mixing Wavelength Conversion using a Pure Continuous Wave Pump." Journal of Lightwave Technology, vol. 24, No. 1, Jan. 2006, p. 22-28.

Turner, A., et. als., "Ultra-low Power Parametric Frequency Conversion in a Silicon Microring Resonator." Optics Express, vol. 16, No. 7, 2008, p. 4881-4887.

Agarwal, A., et. als., "All-optical Loadable and Erasable Storage Buffer Based on Parametric Nonlinearity in Fiber," Journal of Lightwave Technology, vol. 23, No. 7, Jul. 2005, p. 2229-2238.

Tang, R., et als., "In-line frequency-nondegenerate phase-sensitive fiber-optical parametric amplifier." IEEE Photonics Technology Letters, vol. 17, No. 9, Sep. 2005, p. 1845-1847.

Tang, R., et als., "Gain Characteristics of a Frequency Nondegenerate Phase-Sensitive Fiber-Optic Parametric Amplifier with Phase Self-stabilized Input." Optics Express, vol. 13, No. 26, 2005, p. 10483-10493.

Berman, A., et. als., "A Little Too Personal: Privacy Concerns Dot Mobile Revenue Landscape." retrieved on Jul. 31, 2008 from http://www.naa.org/Resources/Articles/Digital-Media-Moving-To-Mobile-Privacy/Digital-Media-Moving-To-Mobile-Privacy.aspx.

Davis, Wendy, "FTC Asked to Protect Mobile Privacy." Online Media Daily, Retrieved on Jan. 13, 2009 from http://www.mediapost.com/publications/?fa=Articles.showArticle&art_aid=98192.

* cited by examiner

METHOD AND APPARATUS FOR OPTIMIZED ANALOG RF OPTICAL LINKS

CROSS REFERENCE TO RELATED APPLICATIONS

The present invention claims the benefit of U.S. provisional patent application 61/116,468 filed Nov. 20, 2008, and U.S. provisional patent application 61/155,285 filed Feb. 25, 2009, the entire contents and disclosure of which are incorporated herein by reference as if fully set forth herein.

GOVERNMENT LICENSE RIGHTS

This invention was made with Government support by the Defense Advanced Research Projects Agency under Contract No. HR0011-08-C-0026. The Government has certain rights in this invention.

FIELD OF THE INVENTION

The present invention relates generally to optically filtered links, and in particular, to optimization of analog RF optical links.

BACKGROUND OF THE INVENTION

The elements of a high performance analog RF optical link have received considerable study and attention, but system performance continues to fall short of aggressive application performance goals. Considering the RE link as a whole, methods of extended range phase modulation include phase tracking loops that are limited to low bandwidth due to active electronics and closed loop delays. At the optical to electrical conversion end of the link, high power, high efficiency photodiodes have been a longstanding topic of active research. Recent reports of 19 dBm output RE power at 25 GHz from a 20 micron device demonstrate impressive performance, but exhibit RF power reduction effects in small high bandwidth devices attributable to current saturation effects. In between these parts of the link, system operation has focused on minimizing loss.

High performance Optical-RF links can exploit use of electro-optic phase modulators in a Mach-Zehnder topology and balanced high-power photo-detection. Balanced detection offers suppression of RN and even-order harmonics, and 6 dB RF gain over a single-ended approach. Typically, the RF input signal creates small optical sideband signals. The desired RF signal is generated by beating optical sidebands created by phase modulation with the optical local oscillator (LO). The residual carrier after the modulator contains little useful signal information. The residual carrier and the LO each generate current in the photodiode that contribute to RIN, shot noise and power. The large residual carrier contributes to RIN but not signal gain, thereby impairing noise performance. In traditional approaches, RF optical links are dominated by Watt-level optical signals and a bare minimum of active elements and control.

Hence, there is a need to optimize analog RF optical links.

SUMMARY OF THE INVENTION

An inventive system and method for high dynamic range photonic RF links described as a Filtered Optical Receive and Transmit array Element (FORTE) is presented. FORTE builds RF optical links that meet meaningful link performance metrics by exploiting pass-band properties of the RF signal (e.g. 4 GHz centered at 2-18 GHz) using optical signal processing to achieve highly linear analog optical links with significant power gain. FORTE introduces fine-grain optical filters, ultra-low noise optical amplifiers, and high-stability, active system level control that together transform the power balance, signal, and noise relationships of the system. This radical departure from traditional architectures enables a new dimension of optimization in RF Photonics. Using Envelope distortion compensation, a highly effective way to linearize overall link response is provided. Development of manufacturable high-power detector arrays fed by silicon photonic integrated circuits (PIC) brings the benefits of array scaling to the field. FORTE will enable much lower power (>4× reduced detector currents compared to conventional systems) in receive links while simultaneously creating transmit systems that exceed challenging third order intercept requirements. Additional benefits can be provided by the use of optical amplifiers in the link, a high power Erbium-Doped Fiber Amplifier (EDFA) in the transmit link and a novel low-noise phase sensitive optical parametric amplifier (PSA) in the receive link.

The FORTE approach combines recent advances in coherent optical signal processing with aggressive improvement in high power modulators and detector technology to achieve revolutionary enhancement in sensitivity, dynamic range and power handling capability for RF-Optical links in microwave receiver and transmitter applications with innovations in each of four areas: Modulation, Detection, Amplification, and Systems Architecture.

The inventive optical RF photonic link system can comprise a modulator subsystem having at least a modulator and an optical filter, an optical amplifier, and an array of photodetectors, each having a plurality of pairs of diodes, wherein the modulator subsystem performs electrical to optical conversion along with distortion compensation and optical filtering on a signal and the filtered signal is amplified by the optical amplifier and sent to the array of photodetectors. In one embodiment, the optical filter extracts upper and lower first order optical sidebands and suppresses residual carrier. The optical amplifier can be an erbium doped fiber amplifier or a phase sensitive amplifier. Optical power can be delivered to each diode of the array of photodetectors via a photonic integrated circuit. In one embodiment, the modulator subsystem employs envelope precompensation. The signal can be amplified using optical phase sensitive amplifiers pumped by a local oscillator creating a difference between optical signal gain and noise gain, and the optical phase sensitive amplifiers can be optical resonant phase sensitive amplifiers. In one embodiment, an optical controller system is implemented to stabilize interferometric path variations between local oscillator and signal paths. In one embodiment, the optical filters are aligned using a small signal dither locking technique to stabilize to a known optical signal.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
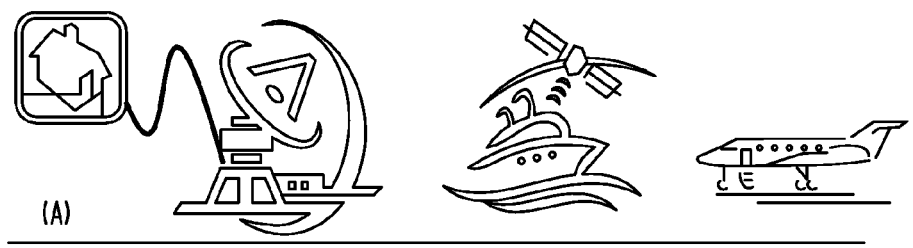
FIG. 1(A) illustrates application contexts for RF photonic links.
FIG. 1(B) illustrates conceptual block diagrams for the receive (downlink) system of the RF photonic links of FIG. 1(A)
FIG. 1(C) illustrates conceptual block diagrams for the transmit (uplink) system of the RF photonic links of FIG. 1(A)
Figure 1:
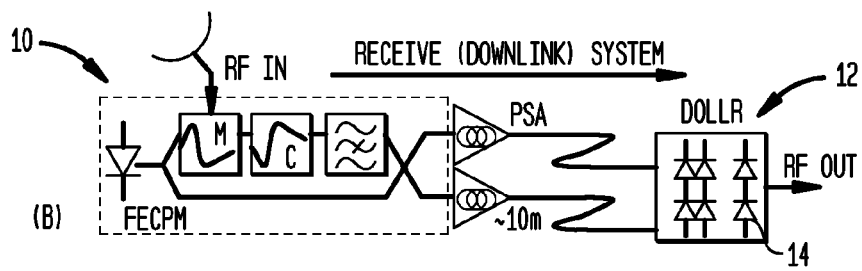
Figure 1:
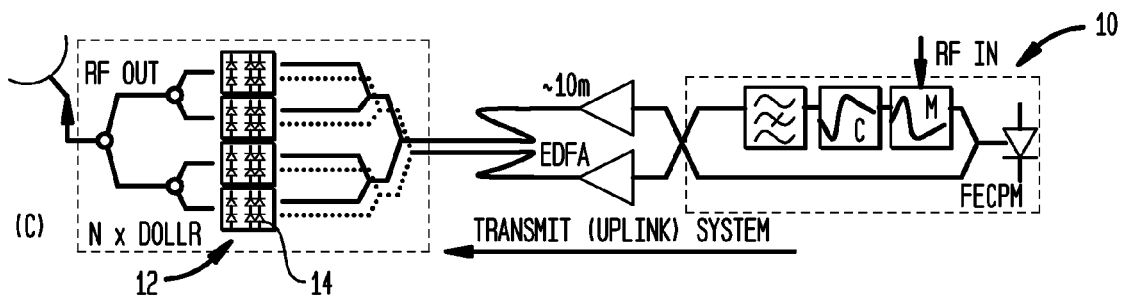

An inventive system and method for optimization of analog RF optical links, called FORTE, is presented. FORTE combines recent advances in coherent optical signal processing with aggressive improvement in high power modulators and detector technology to achieve revolutionary enhancement in sensitivity, dynamic range and power handling capability for RE-Optical links in microwave receiver and transmitter applications. FIG. 1 illustrates several application contexts for high fidelity RF photonic links; FIG. 1(B) shows the FORTE uplink (transmit), and FIG. 1(C) shows the FORTE downlink (receive) systems. Both uplink and downlink source elements share a new filtered, envelope compensated phase modulation (FECPM) subsystem 10. Besides enabling a new and radically simpler form of linearized phase modulation, the ultra-fine (~4 GHz) filtering technology that could be realized in various physical technologies including silicon photonics central to the FECPM 10 concept removes all but the modulated sidebands from the link, and coherently couples a local oscillator to them.

By removing the unmodulated carrier, FECPM 10 removes a major source of noise, allowing a new optical power balance in link architecture. In the RX subsystem, the signal is then coupled to a resonant narrow-band phase-sensitive optical amplifier (PSA), a radical new element in analog optical links. The PSA, presenting essentially no gain to phase-incoherent noise while offering significant gain to the signal, changes the power optimization yet again to favor much lower overall optical power levels, beneficially reducing power required in FORTE's last new downlink component, a distributed photodetector 12 comprised of several, for example about eight, pairs of balanced photodiodes 14. Optical power is delivered to each diode via a photonic integrated circuit (PIC). Currents from each diode are combined to yield 100-480 mA (breakdown limited) in this Distributed Optical Low Loss RF (DOLLR) converter 12.

Figure 2:
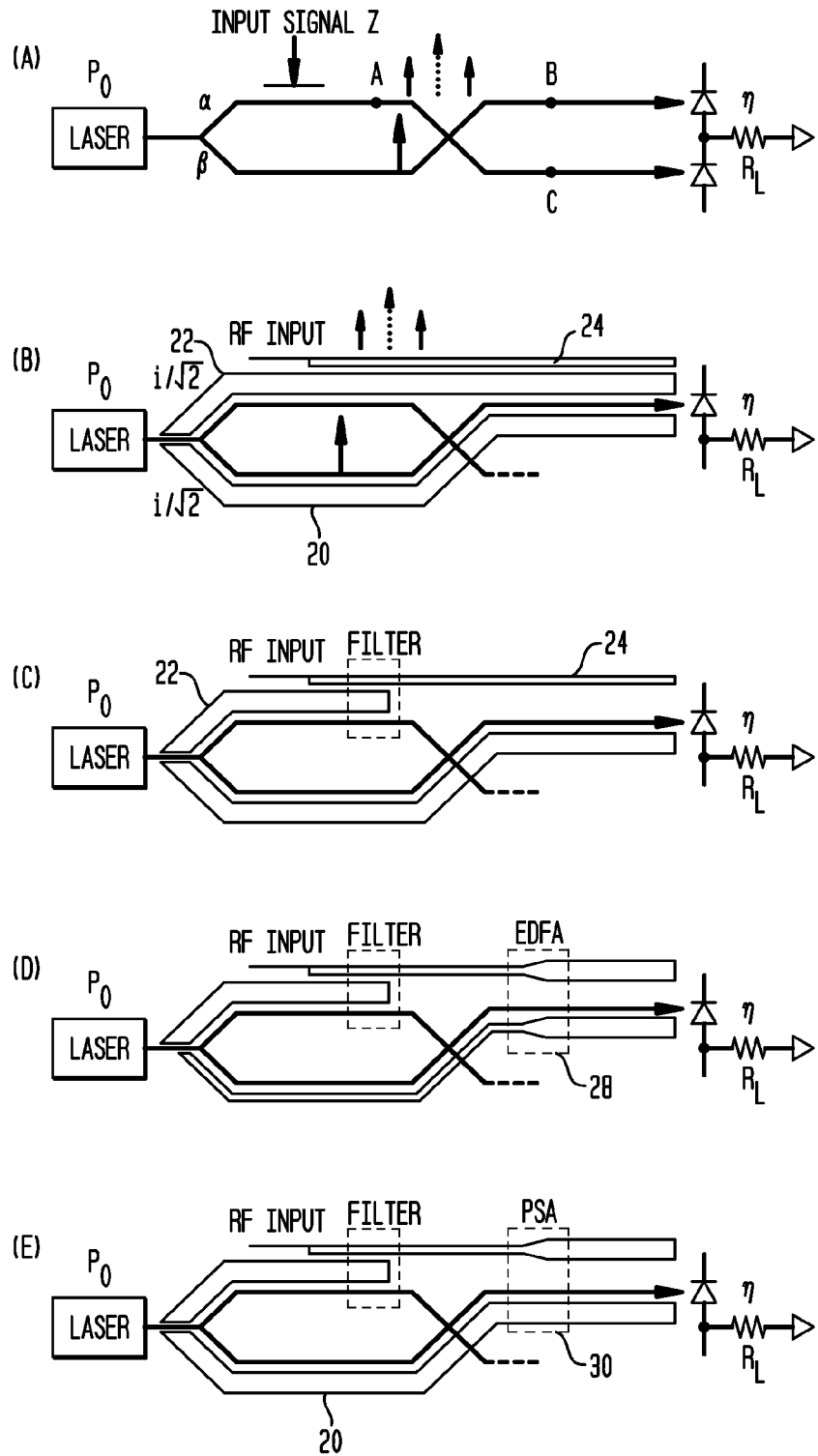
FIG. 2(A) shows baseline phase modulated link with coherent LO and balanced detection.
FIG. 2(B) shows a symbolic power flow in upper path of the baseline link with small sideband signal, residual carrier, and LO; (the lower path is similar and not shown), phase modulation is applied to the upper aim of the Mach Zehnder interferometer.
FIG. 2(C) shows a symbolic power flow in the link when optical filtering is introduced into the link of FIG. 2(A)
FIG. 2(D) shows a symbolic power flow in the link when an EDFA is introduced into the link of FIG. 2(A)
FIG. 2(E) shows a symbolic power flow in the link when a Phase Sensitive Amplifier (PSA) is introduced into the link of FIG. 2(A)

In the uplink (transmit) system, higher output power levels are required, which favors the use of a high-power Erbium-Ytterbium Doped Fiber Amplifier (EDFA) following the FECPM to deliver Watt range outputs to an array of DOLLR elements through a precision splitter network. The outputs of the DOLLR elements are combined in a second hierarchical RF combiner resulting in an efficient, highly-scalable uplink, as shown in FIG. 1(C). High performance Optical-RF links often use electro-optic phase modulators in a Mach-Zehnder topology and balanced high-power photo-detection as shown in FIG. 2. Balanced detection offers suppression of RIN and even-order harmonics, and 6 dB gain over a single-ended approach. As shown, the input coupler splits the input field by $\alpha$ in the upper signal path and $\beta$ in the lower LO (local oscillator) path. The dual-port combiner is a 50:50 coupler. Optimal gain is achieved in the traditional link when the input power $P_0$ is divided equally between the signal path ($P_S = \alpha^2 P_0$) and the LO path ($P_L = \beta^2 P_0$). The insertion power gain can be expressed as $$G_P = 4 I_{pd}^2 (\pi R_L / V_\pi)^2 \text{ where } I_{pd} = \frac{1}{2} \eta P_0$$

is the DC photocurrent. The signal gain can be enhanced by increasing optical power $P_0$. While $P_0$ can be increased to mitigate shot noise, which scales as $I_{pd}$, there is a noise floor created by residual RIN that also scales as $I_{pd}^2$. With the introduction of low-noise high-power lasers (RIN<−160 dB/Hz) and balanced high-power photodetection (matching error $\epsilon$<5%), "residual" laser RIN has displaced shot noise as the primary limit on sensitivity, e.g., minimum detectable signal (MDS). A noise figure (NF) of 3.5 dB can be achieved with $V_\pi$=2.5V when $I_{pd}$>>4q/$\epsilon$ RIN≈400 mA. High optical power is required, since shot noise and residual RIN contribute equally to a NF of 5.4 dB when $I_{pd}$=400 mA.

FIG. 2(B) illustrates the optical power flow in the upper branch of a traditional balanced link; note that a similar flow exists for the lower branch (not shown for clarity). Two large optical carriers are shown, one for the Local Oscillator path 20 and another for the signal path 22. The RF input signal creates small optical sideband signals 24. The desired RF signal is generated by beating optical sidebands 24 created by phase modulation with the optical LO 20. The residual carrier in the upper signal path 22 after the modulator contains little useful signal information. The residual carrier 22 and the lower LO 20 each generate current in the photodiode that contribute to RIN, shot noise and power. The large residual carrier 22 contributes to RIN but not signal gain, thereby impairing noise performance.

One innovation of the present invention places an optical filter after the phase modulator, shown as point A in FIG. 2(A), extracting upper and lower first order optical sidebands and suppressing the residual carrier as illustrated in FIG.

2(C). The weak sidebands 24 beat with the strong LO 20, and remove the residual carrier 22 that does not contribute to the desired RF output signal. The insertion voltage gain for this inventive approach can be written as $G_V = 8I_{pd}R_L(\pi/V_\pi) \cdot \sqrt{P_S/P_L}$, where $P_S$ and $P_L$ represent the optical power in the signal 22 and LO 20 paths, respectively. Using narrow band filters 26 to extract the optical sidebands 24 (4-8 GHz bandwidth) while rejecting residual carrier 22, optimal operation is achieved with $P_S > P_L$ at a given photocurrent $I_{pd}$. Thereby significant improvement in sensitivity and power efficiency is achieved. Optical sideband filtering allows decoupling the linkage between noise and signal gain. With FORTE technology, the receiver operates below the RIN limit using photocurrents below 400 mA. High rejection optical sideband filters also allow placement of optical gain elements in the signal path 22. The FORTE transmit system, shown in FIG. 2(D), utilizes an EYDFA 28 while the receive system, shown in FIG. 2(E), uses an ultra-low-noise PSA 30.

Linearity is another significant concern for RF links. LiNbO$_3$ phase modulators are well suited for the high optical power levels required to reach the RIN limit. The input intercept point for third-order two-tone intermodulation is determined by $V_\pi$: IIP3=$(4/\pi^2)V_\pi^2/R_L$ and is +17 dBm for $V_\pi$=2.5V. While reduction in $V_\pi$ increases signal gain and improves the NF, it does not increase the spurious free dynamic range (SFDR) given by $$SFDR = \frac{2}{3}(IIP3 + 173.8 - NF) \approx 126.5 \text{ dB/Hz}^{2/3}$$

since IIP3 is also diminished.

Another innovative benefit of optical filtering is to permit an envelope precompensation technique (FECPM) to be used. This increases IIP3 by 10-20 dB. Envelope precompensation can be implemented for each RF frequency band using a broadband low-power squaring circuit and baseband (DC-4 GHz) electro-optic signal processing. As discussed in more detail below, this arises from the nature of a filtered phase modulated link. This FECPM system is integral to satisfying challenging TX and RX metrics, and is described further below. The benefits of optical filtering are also evident in the FORTE transmit system, where FECPM and optical amplification increase OIP3 while reducing photodetector current $I_{pd}$ and power dissipation.

The FORTE transmitter objectives can be met using an array of high power balanced photodetectors optimized for maximum power gain (8-14 dB) at output power of 5-15 W and represent another innovative element. Each photodetector is capable of 400 mA current (100-240 mA initially) and is compatible with a corporate power combiner (<8 GHz) or a quadrature power combiner (>8 GHz), depending on the frequency band. Each photodetector is itself comprised of an array of individual photodiodes based, for example, on known p-i-n or uni-traveling carrier designs that are fed by an integral Silicon Photonic PIC. Such a Distributed Optical Low Loss RF (DOLLR) converter can be realized in an integrated package with dual fiber input and single RF output. FECPM-based envelope distortion compensation also reduces third order IMD in the transmitter, allowing greater modulation depth for a given photocurrent.

The effectiveness of optical filtering permits introduction of additional signal gain mechanisms to increase conversion gain without increasing noise from residual carrier amplification. Conversion gain can be increased by putting more optical power into the signal path without increasing noise, because carrier has been suppressed. Two distinct methods for achieving this are shown in FIGS. 2(D) and 2(E), suitable for the FORTE transmitter and receiver, respectively. An EDFA 28, shown in FIG. 2(D), may be used to amplify the sideband signal while restoring the LO power to a high level for efficient coherent detection. With high optical power allocated to the signal path, the modulator transducer gain overcomes traditional problems with 4-6 dB EDFA noise figure.

FORTE employs another innovation with a resonant phase sensitive amplifier (PSA) 30, as shown in FIG. 2(E), where the filtered double-sideband signal is amplified using two optical PSAs pumped by a strong LO 20. The inventive PSA 30 uses a waveguide fabricated in a non-linear optical material such as As$_2$S$_3$ and provides 13-30 dB of linear signal gain via four-wave-mixing. The gain for a double sideband signal (signal and idler) suitably phase aligned to a high power LO (pump) is much greater than that for incoherent fluorescence, e.g. optical noise. This difference between optical signal gain and noise gain fundamentally changes the system optimization. Since the LO power used to pump the PSA can also serve as a LO for coherent detection, a major advance in power efficiency is achieved. The PSA allows the RX system to meet its metrics with only a single DOLLR element operating at current levels well below traditional links (~100-200 mA). Taken together, these architectural refinements comprise yet another innovative element. The following table shows innovative aspects of the present invention.

| Innovative Element | Uniqueness/Benefits of Proposed Approach | Relative to Current SOTA |
|---|---|---|
| Modulation | | |
| Narrowband optical filtering (4 GHz) | A) Narrowband filters fundamentally alter the power allocation in RF photonic links, reduce noise in detection systems. B) Filters enable new forms of envelope link compensation. C) Narrowband filtering is employed in both TX and RX systems. | 4 GHz optical filters have not been integrated with RF photonic systems. |
| Filtered Envelope Compensated Phase Modulator (FECPM) using compensation and narrowband (~4 GHz optical filters). | A) >20 dB IMD3 suppression ideally possible with this method. Requiring only 4 GHz drive on compensating modulator increases sensitivity of compensation circuit. B) Quadratic distortion in modulator, amplifier, and detectors can be compensated. C) The FECPM concept is employed in both TX and RX systems | FECPM not previously known; FECPM is first to derive a closed form for the response of a filtered phase modulated link. Envelope compensation based on this form is unique. |

| Innovative Element | Uniqueness/Benefits of Proposed Approach | Relative to Current SOTA |
|---|---|---|
| Detection | | |
| Distributed Optical Low Loss RF Conversion (DOLLR) elements and arrays of DOLLR elements that optimize the power conversion efficiency of the diode networks | A) Reduced power handling in individual detectors permits other diode specifications to be improved. Current-summing and power-summing combiners are both used to maximum advantage for optimum power gain.<br>B) Balanced diodes suppress IMD2.<br>C) Optical PIC feed structure decouples detector and optical feed.<br>D) DOLLR elements are used singly in RX and in arrays in TX systems. | Balanced photodiode arrays have not been demonstrated for RF photonic applications. Matching networks have not been employed to optimize power transfer. Combining power from >20 diodes to provide ~15 W of RF power has not been demonstrated. |
| Amplification | | |
| Resonant Phase Sensitive Amplifier (PSA) | A) 20-30 dB of signal gain that does not amplify noise to the same degree relaxes constraints on source, modulator, and detection systems.<br>B) Using the un-modulated source laser as both the PSA pump and the coherent LO maximizes the power efficiency of the link.<br>C) Selection of thin film materials promises co-integration with Silicon Photonic platforms.<br>D) The PSA is employed in the RX subsystem only. | Optical PSA has not been employed in RF photonic links. Integration of PSA with a Silicon Photonic Platform has not been demonstrated. |
| Systems Architecture | | |
| New Power optimization between signal, pump, and LO is possible with FORTE architecture | Introducing filters, compensated modulators, and PSAs is a system optimization offering a new optimum operating point at lower dc photocurrent, reduced transducer gain requirements, and greater linearity than current architectures | FORTE represents a significant departure from traditional RF photonic link architectures. |

The FECPM device and its use of envelope compensation of a filtered phase modulated link are novel concepts enabled by the availability of narrow-band integrated optical filters and their use to enable compensation in broadband links.

The DOLLR conversion concept builds on work on traveling wave amplifiers and traveling wave photodetectors. Velocity-matched distributed detectors have been extensively studied, including in balanced geometries. Performance has been shown to exceed discrete detectors, which translates directly into enhanced RF conversion efficiency in RF links. Work on arrays of balanced photodiodes fed with PICs is unique, and alternative matching networks to maximize power transfer is novel, as discussed in more detail below.

Optical parametric amplifiers (OPA) in fiber with high small signal gains of 30-60 dB have been extensively studied with a focus on broadband wavelength conversion or similar operations. Newer materials include photonic crystal fiber, bismuth oxide nonlinear fiber, chalcogenide glass, and resonant silicon structures. All have been studied for phase insensitive configurations that, like EDFAs, have a fundamental 3 dB NF limit PSAs are another class of OPA in which gain depends on the phase of input signals. PSAs have a unique potential for 0 dB noise figure. FORTE creates a distinctive integrated narrow-band resonant PSA in using chalcogenide glass to enhance gain with ultra-low noise.

Figure 3:
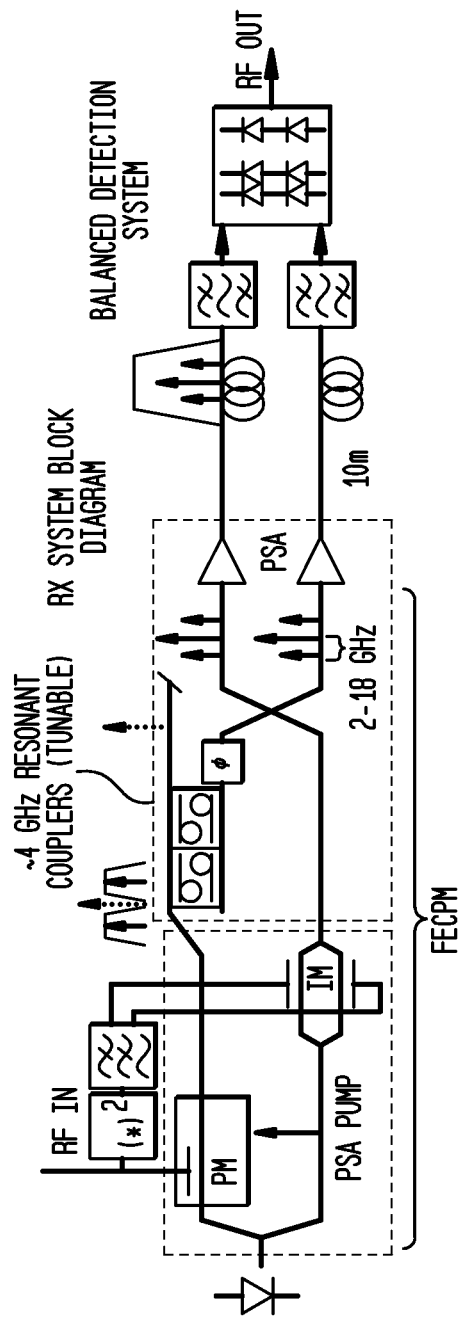
FIG. 3 shows a receive subsystem in accordance with the present invention.

The proposed receive path subsystem is illustrated in FIG. 3. A band limited RF input signal Z(t) is supplied to a compound modulator structure consisting of phase modulator designed for low loss and low $V_\pi$ and a reconfigurable intensity modulator for envelope compensation. The modulated optical signal is filtered to suppress the optical carrier while passing both first-order optical sidebands.

This Filtered Envelope Compensated Phase Modulator (FECPM) relies on the nature of filtered phase modulation and significantly increases OIP3. The significant innovation of the FECPM is that the compensation signal needs only to have the response of the envelope (4 GHz) rather than of the carrier (up to 20 GHz), as will be described in detail below.

The compensation signal may be applied serially or in parallel with the desired phase modulation, and the compensation signal can be derived electrically or optically.

The modulated signal is operated in parallel to reduce overall link loss in the signal path. This signal is then combined with an un-modulated optical pump signal derived from the common optical source. Optical phase relationships are controlled in the FECPM using feedback control. Additional signal gain is provided by supplying the resulting set of phase coherent signals to an optical amplifier. Conventional EDFAs may be employed, but a narrow-band resonant phase sensitive amplifier (PSA) can be advantageously employed for its ultra-low noise performance. This PSA is a novel component whose significant link benefits were outlined above and described further below. The resulting amplified signals are further filtered and downconverted (>10 dB coherent conversion gain) in a distributed balanced photodetector array.

Figure 4:
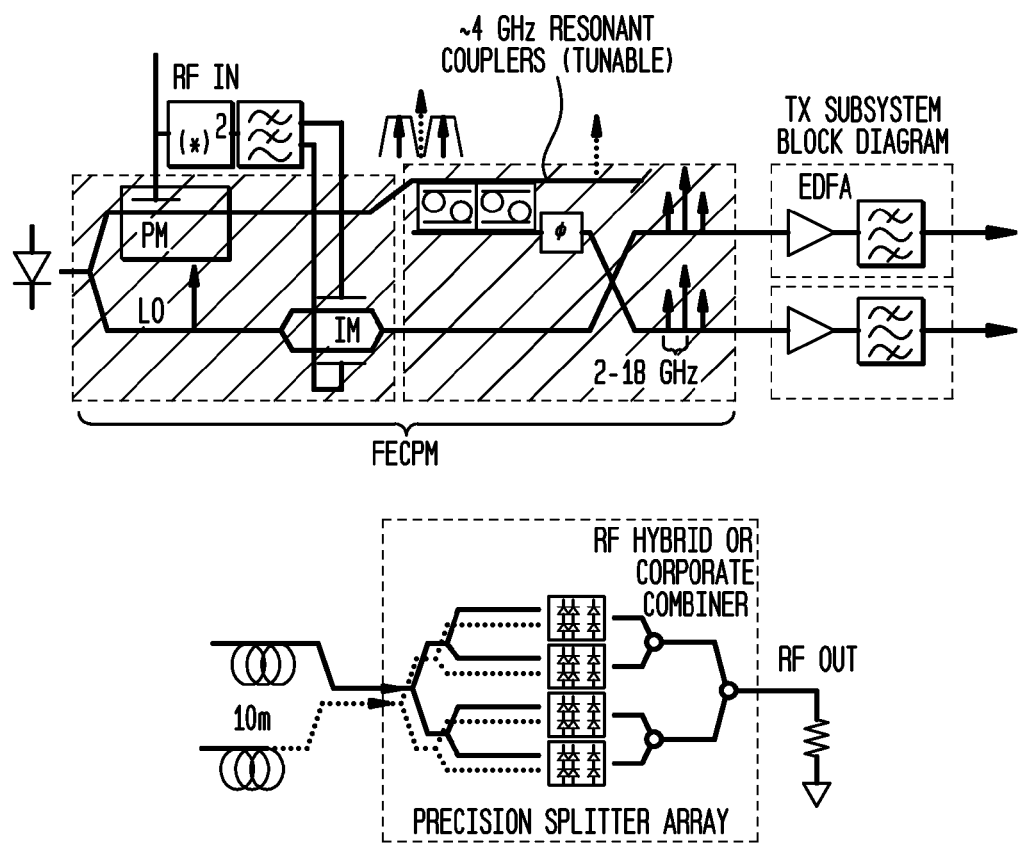
FIG. 4 shows a transmit subsystem in accordance with the present invention.

The transmit subsystem is depicted in FIG. 4. Opportunities for integration are highlighted. An optical source is modulated with an RF carrier (RF in) through a similar FECPM structure as in the Receive Subsystem, filtered, and coherently combined with a local oscillator, here derived from a common source. It is then amplified, subjected to fan-out, further filtering, and appropriate time delay networks prior to RF conversion in a photodiode array and power combining network at which the RF power can be measured.

A demonstration of how FORTE achieves a high performance receiver link is presented. The band limited signals can be written as $Z(t)=\rho(t)\sin(\omega_c t+\theta(t))$ or $Z(t)=X(t)\sin(\omega_c t)+Y(t)\cos(\omega_c t)$ where $f_c=\omega_c/2\pi$ is the mid-band (carrier) frequency and $X(t)=\rho(t)\cos\theta(t)$ and $Y(t)=\rho(t)\sin\theta(t)$ are the quadrature modulation components. For a 4 GHz RF signal bandwidth, the quadrature components each have a 2 GHz bandwidth. The optical sidebands created by this quadrature passband signal can be described by the Bessel series expansion $e^{j\pi Z(t)/V_\pi}=J_0(\pi\rho/V_\pi)+\Sigma_{k\geq 1}2iJ_k(\pi\rho/V_\pi)\sin k(\omega_c t+\theta)$. The FORTE optical filters shown in FIG. 2 retain only 4 GHz (±2 GHz) portions of both (upper and lower) first order optical sidebands and suppress the residual carrier. The even order terms can be further suppressed with a dual arm modulator. The field from the 50:50 combiner can be expressed as $$E = \frac{1}{\sqrt{2}}\sqrt{P_0}\left(i\alpha\zeta J_0(\pi\rho/V_\pi) + 2\alpha J_1(\pi\rho/V_\pi)\sin(\omega_c t + \vartheta) \pm \beta\right)$$

where $P_S=\alpha^2 P_0$ and $P_L=\beta^2 P_0$ are the optical power distributed to the signal and LO paths of the modulator and $\zeta$ is the carrier suppression (−40 dB). Without amplification, the current generated in the photodetector is $$i \cong \frac{1}{2}\eta P_L \pm 2\eta\sqrt{P_S P_L}\,J_1(\pi\rho/V_\pi)\sin(\omega_c t + \vartheta)$$

where $\eta$ is the responsivity. The DC photocurrent is $$I_{pd} \cong \frac{1}{2}\eta P_L$$

and is (nearly) independent of $P_S$. The combined small-signal gain of the modulator with balanced coherent detection is $G_\gamma = 4\pi\eta\sqrt{P_S P_L}R_L/V_\pi$ where $R_L$ is the load resistance. The gain can be enhanced without increasing $I_{pd}$ and the associated noise by increasing $P_S$. The signal-noise advantage is retained when an amplifier is placed before the photodetectors. Either an EDFA or a PSA can be used to maximize the minimum detectable signal (MDS) and OIP3. The additional noise generated by an EDFA with NF=6 dB can be overcome using a large $P_S$=370 mW and allowing the EDFA to regenerate a strong LO from $P_L$=30 mW.

Even better overall performance can be achieved with a PSA which offers 17 dB signal gain to overcome the RIN floor while introducing much less noise than an EDFA. By amplifying only sideband signals, the PSA acts to increase the effective signal power $P_S \to G_{PSA}{}^s\alpha^2 P_0 \approx 5$ W using the 100-200 mW LO as a pump. By filtering a phase-modulated signal to suppress the carrier and pass only the 4 GHz sidebands, it is possible to correct for distortions using the concept of FECPM.

The two-tone distortion behavior for optically filtered phase modulation has simple close-form expressions. The two-tone input can be represented by $X(t)=2A\cos(\Delta\omega t)$ and the fundamental output signal and third-order IMD are proportional to $J_1(\pi A/V_\pi)J_0(\pi A/V_\pi)$ and $J_1(\pi A/V_\pi)J_2(\pi A/V_\pi)$, respectively. These expressions predict a third-order input intercept of IIP3=$(4/\pi^2)$ $V_\pi^2/R_L \to 17$ dBm for $V_\pi$=2.5V. Although the inherent IIP3 for filtered and unfiltered links is nearly identical, the impairment with passband filtering appears as envelope distortion which can be compensated using baseband gain modulation. Second order two-tone distortion is dominated by leakage of the residual carrier $4\zeta I_{pd}(\alpha/\beta)J_0^2(\pi\rho/V_\pi)$ at baseband, and gain matching error in the balanced detector which leaves a residual second harmonic component $4\epsilon I_{pd}(\alpha/\beta)^2 J_1^2(\pi\rho/V_\pi)\sin^2(\omega_c t+\theta)$. Time domain simulations show that OIP2 is 30 dB greater than OIP3 (without predistortion compensation) using the inventive dynamic gain control system.

Figure 5:
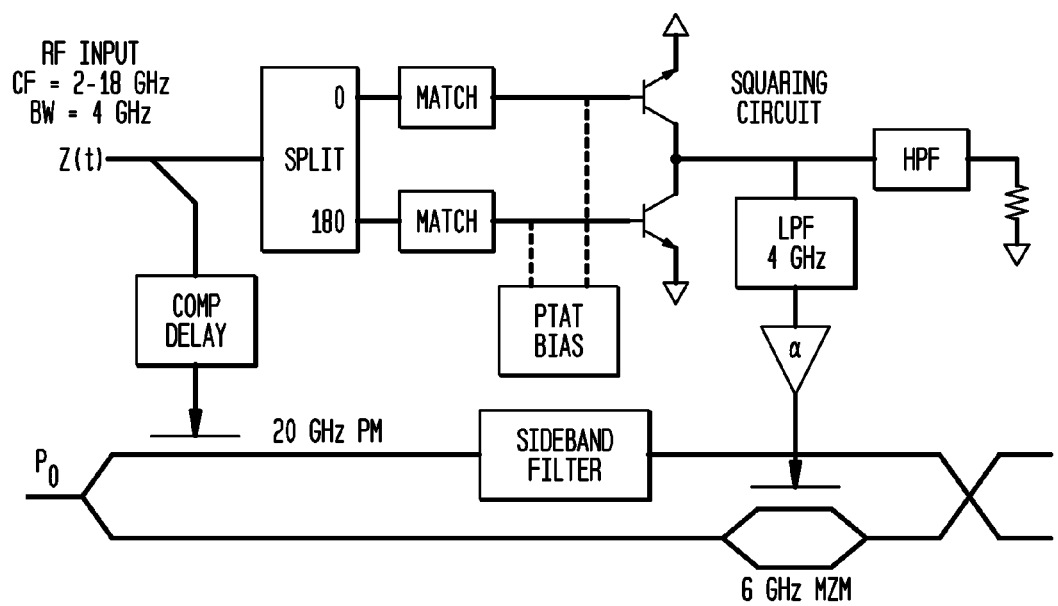
FIG. 5 shows distortion compensation using square law envelope detection and baseband gain modulation.

The large signal behavior for the FORTE link is described by the Taylor expansion $$J_1(\pi\rho/V_\pi) \cong \frac{1}{2}(\pi\rho/V_\pi) - \frac{1}{16}(\pi\rho/V_\pi)^3$$

where $\rho^2 = X(t)^2 + Y(t)^2$ represents the signal envelope. The effects of envelope distortion can be mitigated using feedforward correction by modulating the LO or signal field amplitude by $$1 + \frac{1}{8}(\pi\rho/V_\pi)^2,$$

the fundamental FECPM compensation effect. This operation can be performed using a 20 GHz intensity modulator biased for a cosine response; however, the optical insertion loss is quite large. The bandpass property of the input signal can be exploited and distortion compensation implemented using a combination of optical and electronic means. A low power squaring circuit implemented with commercial 65 GHz SiGe transistors followed by a 4 GHz low pass filter is shown in FIG. 5 which can extract the 4 GHz signal envelope $\rho(t)^2$ from the input signal voltage Z(t). A −10 dB coupler takes a small sample of the RF signal and drives the transistor pair in anti-phase through a band optimized matching network. FORTE employs several optimized matching networks for the phase modulator and photodetectors as well. Although better performance could be achieved with a SiGe ASIC from a commercial foundry, the necessary performance can be obtained in a discrete implementation at much lower cost.

It is well known that pre-distortion compensation requires precise signal tracking, typically better than 0.1 dB for 25 dB IMD suppression. The squaring circuit has been extensively simulated using SPICE and a prototype was built and tested in the lab using 2 GHz Ft transistors which exhibited the desired behavior from 10-1000 MHz. It can be established that the conversion gain of the proposed squaring circuit is primarily limited by the effective emitter series resistance $r_E$. When each transistor is biased at a collector current $I_{c0}$, the combined collector current can be described by $$I_C = I_{C0}\frac{W(xe^x e^u) + W(xe^x e^{-u})}{x}$$

where W(•) denotes the Lambert W-function, $x=I_{c0}r_E/V_T$ and $u=\lambda Z(t)/V_T$ represents the sampled RF signal as it appears at each base. After low pass filtering to remove the carrier second harmonic, the baseband collector current is $$\hat{i}_C = \frac{1}{8}I_{C0}R_L f(x)(\lambda\rho/V_T)^2$$

where $f(x) \approx 1 - 0.9x + 0.8 \times \ln(x)$. The recovered baseband envelope signal is applied to an intensity modulator in the LO path (or signal path) which is optimized for low insertion loss (<2 dB). The desired envelope distortion compensation is achieved when the compensation modulator is driven through an additional gain (loss) $\alpha_{EC}$ that satisfies $$\alpha_{EC}(R_L/r_E) \times f(x)\frac{1}{2}\lambda^2 = V_T(1-\lambda)^2(\pi/V_\pi).$$

This is achieved with α≈0.2 in one implementation, so additional gain is not required which would compromise the noise performance.

Figure 6:
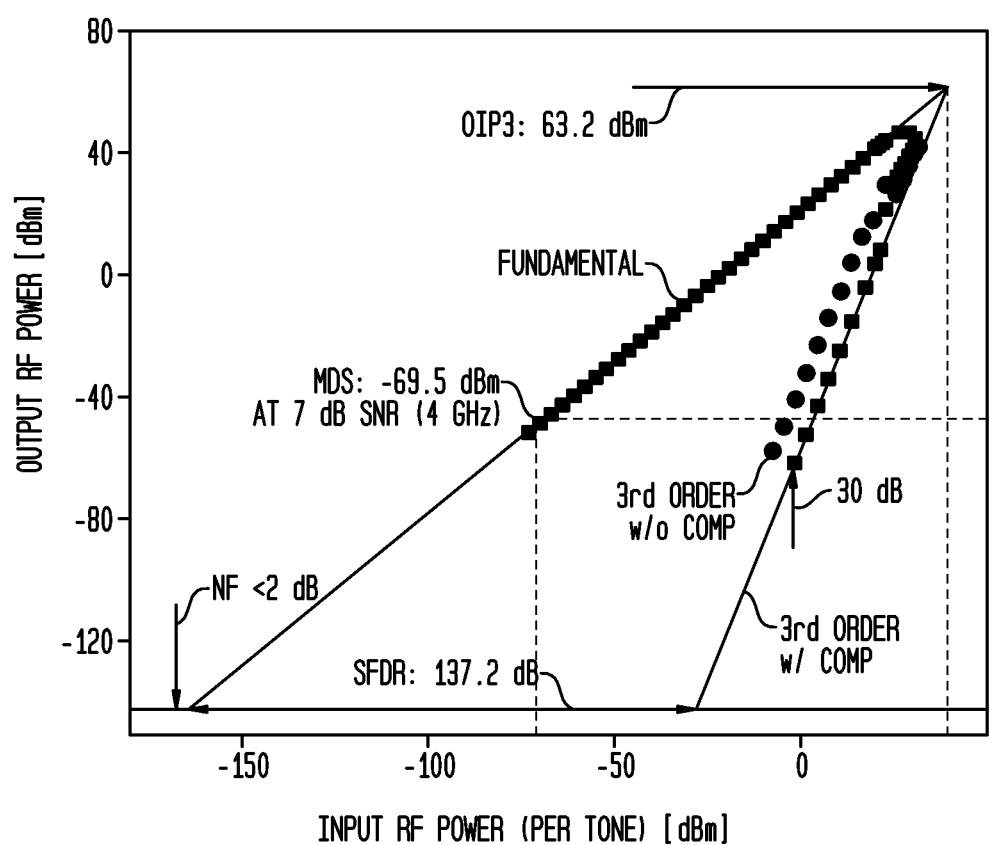
FIG. 6 shows simulation results for distortion compensation feed-forward baseband gain modulation.

The merits of envelope compensation can be confirmed through simulation and experiments in the lab with a prototype optically filtered link operating at $f_c$=8 GHz FIG. 6 shows the predicted results obtained with VPITransmissionMaker™ using an ideal squaring to emulate the circuit in FIG. 5. Over 30 dB improvement in OIP3 can be achieved in principle. The residual intermodulation is limited by the higher order terms of the composite transfer function $$J_1(\rho)\left(1 + \frac{1}{8}\rho^2\right).$$

Envelope compensation eventually fails as the $\rho^5$ term assumes dominance.

Figure 7:
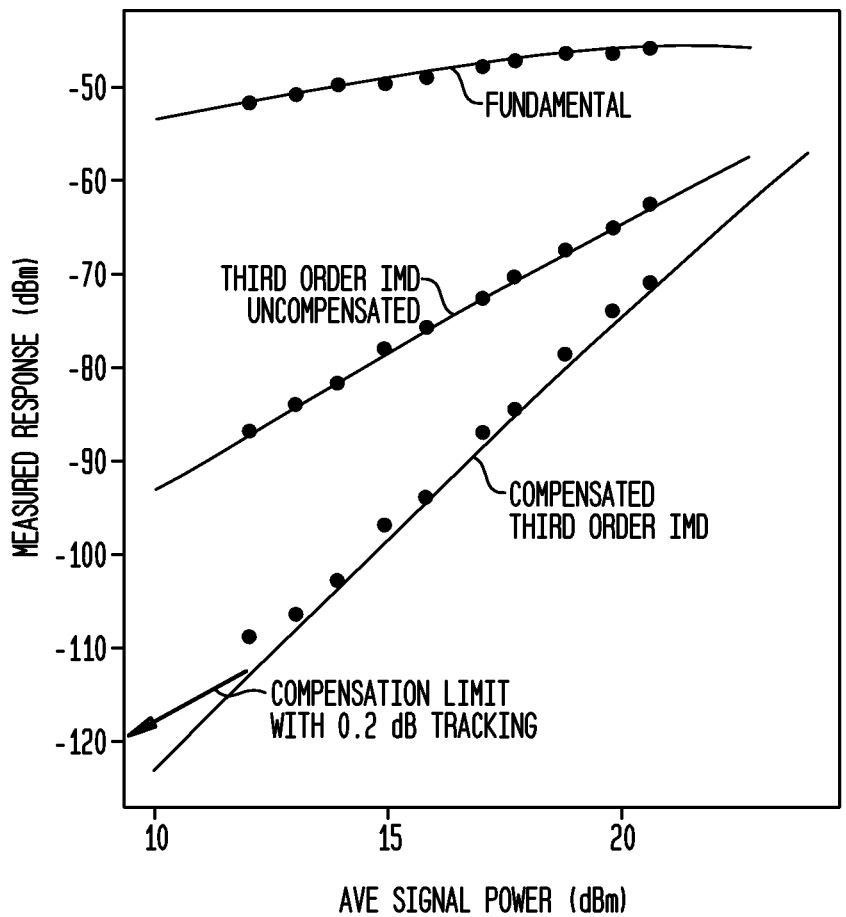
FIG. 7 shows experimental validation of envelope distortion compensation using two-tone measurements.

Envelope distortion compensation was experimentally demonstrated in the lab using two-tone measurement with a prototype optically filtered link operating at $f_c$=8 GHz with Δf=10 MHz. Lacking an 8 GHz implementation of the squaring circuit, the compensation modulator was driven with a third phase locked synthesizer at twice the two-tone signal spacing (20 MHz) since $X^2=4A^2 \cos^2 \Delta\omega t = 2A^2(1+\cos 2\Delta\omega t)$. The compensation amplitude was varied with the RF signal level at 2 dB/dB once an optimal level was found. The measured results are shown in FIG. 7 along with the predicted response (solid lines). There is extremely good agreement between theory and experiment. The IMD reduction was ultimately limited to 22 dB at lower signal levels by residual IMD of the power amplifier driving the RF phase modulator. It is generally difficult to compensate multiple distortion mechanisms since the harmonics have different phases and amplitudes. Several distortion paths could be compensated in the baseband approach using a poly-phase control circuit with one feedforward path tracking each distortion path.

It is assumed throughout that the input and output are matched to 50 ohm source and load impedances, respectively, over the requisite 4 GHz band. A more advanced receiver subsystem will use a 400 mW source laser to deliver $P_S$=100 mW and $P_L$=300 mW. The source power can be increased using a master oscillator—EDFA if optical losses are too great. The LO signal produces a DC photocurrent of 38 mA with 5 dB of additional system loss. Assume a laser RIN=−160 dB/Hz and that dynamic control achieves optical-electrical gain matching ε<0.05. The proposed modulator has $V_\pi$=2.5V at 1 GHz and exhibits a single pole frequency roll-off with 14 GHz corner frequency. The photodetector has a DC responsivity of 0.8 A/W and exhibits a single pole frequency roll-off at 20 GHz.

Further assume that the envelope distortion compensation improves IIP3 by 15 dB (ξ=32), which is a conservative estimate based on simulation and measured results. A signal gain of at least 17 dB from the PSA with 100 mW of pump power can be achieved. The corresponding gain for noise fluorescence should be less than 1 dB. The low level of noise from the PSA permits a substantial reduction in transducer gain and corresponding reduction in photocurrent $I_{pd}$<100 mA. This results in fewer constraints on the photodetector as well.

The PSA has another remarkable property: envelope distortion is negligible as long as the amplified signal and idler acquire less than 10% of the pump power. Optical filtering also alters the response to source phase noise in coherent detection. The phase noise enhancement is proportional to the ratio of (linewidth)/(filter bandwidth). A 10 dB increase in output noise with a 10 MHz laser and 350 MHz filter has been observed. The effect with a 10 kHz source linewidth and 4 GHz optical filters used in FORTE should be negligible.

Table 2 shows equations describing performance of the FORTE receiver.

TABLE 2

| | |
|---|---|
| End-to-end voltage gain | $G_V = 4I_{pd}\sqrt{G_{PSA}^s P_S/P_L}(\pi/V_\pi)(\eta_{sig}/\eta_{dc})R_L$ |
| Photodetector current | $I_{pd} = \frac{1}{2}\eta_{dc} P_L$ |
| Amplified thermal noise | $\sigma_{input}^2 = G_V^2 k_B T B$ |
| Shot noise at output | $\sigma_{shot}^2 = 4q_e I_{pd} R_L B$ |
| RIN noise at output | $\sigma_{RIN}^2 = \epsilon RIN I_{pd}^2 R_L B$ |
| Signal-ASE beat noise | $\sigma_{sig-ase}^2 = 2q_e I_{pd} \text{nsp}(G_{PSA}^n - 1)(\eta_{sig}/\eta_{dc})^2 R_L B$ |
| System noise factor | $F = 1 + (\sigma_{shot}^2 + \sigma_{RIN}^2 + \sigma_{sig-ase}^2)/\sigma_{input}^2$ |
| Two-tone input intercept | IIP3 = $\xi(4/\pi^2)V_\pi^2/R_L$ |
| Two-tone output intercept | OIP3 = $G_V^2 \xi(4/\pi^2)V_\pi^2/R_L$ |
| Receiver figure of merit | FOM = 1000 · OIP3/F · $P_{DC}$ |

The expressions used to predict link performance are summarized in Table 2, where most of the symbols have their familiar meaning. $G_{PSA}^s$≈17 dB and $G_{PSA}^n$≈0 dB denote the signal gain and noise gain of the PSA, respectively. $(\eta_{sig}/\eta_{dc})$ is the ratio of AC to DC photodiode response at frequency $f_C$.

The predicted performance for the FORTE receiver is summarized in Table 3, which shows predicted receiver performance using a PSA compared against high performance Metrics. Parenthetical values are those required to meet advanced objectives.

TABLE 3

| Band (GHz) | $V\pi$ $\eta_s/\eta_{DC}$ | SHOT RIN ASE | NF (dB) | MDS (dBm) | OIP3 (dBm) | SFDR | OIP2 (dBm) | RFOM |
|---|---|---|---|---|---|---|---|---|
| 2 | 2.5 | 0.2 | 0.9 | −70 | 64 | 136.8 | 87 | >10000 |
|   | 1.0 | 0.02 | (2.8) | (−68) |   | (134.5) | (85) | (10000) |
|   |   | 0.02 |   |   |   |   |   |   |
| 6 | 2.7 | 0.25 | 1.14 | −69.7 | 63 | 137.1 | 86 | >10000 |
|   | 0.96 | 0.02 | (2.8) | (−68) |   | (134) | (85) | (4000) |
|   |   | 0.02 |   |   |   |   |   |   |
| 10 | 3.1 | 0.37 | 1.5 | −69.3 | 63 | 137.5 | 85 | >4000 |
|   | 0.89 | 0.03 | (2.8) | (−68) |   | (133.5) | (85) | (1500) |
|   |   | 0.02 |   |   |   |   |   |   |

TABLE 3-continued

| Band (GHz) | Vπ $\eta_s/\eta_{DC}$ | SHOT RIN ASE | NF (dB) | MDS (dBm) | OIP3 (dBm) | SFDR | OIP2 (dBm) | RFOM |
|---|---|---|---|---|---|---|---|---|
| 14 | 3.5 0.82 | 0.6 0.05 0.03 | 2.2 (2.8) | −68.5 (−68) | 62 | 137.9 (133) | 85 (85) | >1000 (600) |
| 18 | 4.1 0.74 | 0.8 0.1 0.04 | 2.8 (2.8) | −68 (−68) | 61 | 138 (132.5) | 85 (85) | >1000 (200) |

It is also instructive to see what an EDFA requires of the system. The EDFA RX system implementation requires higher transducer gain in the modulator to mitigate EDFA noise; so $P_S$=370 mW. An EDFA with 20 dB gain would amplify a 4 mW LO signal from the FECPM to 400 mW for coherent detection; consequently, a higher power transmitter photodetector array is also required. The PSA analysis can be extended to the EDFA alternative by noting that noise and signal gain are identical: $G_{EDFA}^s = G_{EDFA}^n$.

Table 4 shows the predicted receive system performance using an EDFA in place of PSA. Parenthesis indicate values required to achieve high performance metrics.

TABLE 4

| Band (GHz) | Vπ $\eta_s/\eta_{DC}$ | SHOT RIN ASE | NF (dB) | MDS (dBm) | OIP3 (dBm) | SFDR | OIP2 (dBm) | RFOM |
|---|---|---|---|---|---|---|---|---|
| 2 | 2.5 1.0 | 0.03 0.03 2.7 | 5.7 (5.8) | −65 (−65) | 67 | 130 (126) | 77 (75) | >200 (100) |
| 6 | 2.7 0.96 | 0.03 0.03 3.1 | 6.2 (7.8) | −65 (−63) | 67 | 130 (125.5) | 76 (75) | >200 (40) |
| 10 | 3.1 0.89 | 0.05 0.05 4.0 | 7.0 (8.8) | −64 (−62) | 66 | 130 (125) | 75 (75) | >200 (15) |
| 14 | 3.5 0.82 | 0.08 0.07 5.2 | 8.1 (9.8) | −63 (−61) | 66 | 130 (124) | 75 (75) | >200 (6) |
| 18 | 4.1 0.74 | 0.13 0.12 7.0 | 9.1 (10.8) | −62 (−60) | 65 | 130 (123) | 75 (75) | >200 (2) |

The introduction of modulation compensation, while increasing OIP3, also introduces system loss, thereby degrading minimum detectable signals. Gain is therefore needed to compensate for the losses introduced by the link. In combination with the RF conversion gain derived from the modulator and the detector system, the FORTE receive subsystem derives its gain from an ultra-low noise optical amplifier. A PSA, which uses the nonlinear Kerr effect through the process of four-wave mixing (FWM), can be employed. This PSA theoretically has a NF of 0 dB. This enables almost noiseless amplification of even low power optical signals on the order of −55 dBm resulting from low RF input signals of −68 dBm. In a PSA, the gain depends on the optical phase relationship between the input signals and the high power pump. For a certain phase relationship, the gain is maximized. Noise signals that do not possess this phase alignment will see a much smaller gain, thereby improving the noise properties of the link. The PSA will be critical in attaining ~3 dB NF desirable for advanced applications. Further, as discussed above, this element relieves system demands on both optical modulator and high power photodiodes.

Both fiber and thin film materials can be contemplated for realization of a PSA. Chalcogenide glass films may be pursued for a resonant PSA. These materials have high nonlinear coefficients. For example, $As_2S_3$ has a nonlinear refractive index $n_2$ about one hundred times silica and with low effective area $A_{eff}$ can achieve nonlinear coefficient γ ($=n_2\omega/cA_{eff}$) of 1,000-10,000 times that of silica. Unlike silicon, $As_2S_3$ does not suffer from the harmful effects of two photon absorption that reduces the gain and increases the NF. Further, Stimulated Brillouin Scattering (SBS), which is encountered in PSAs using several kilometers of highly nonlinear fiber is not an issue. Recently, however, SBS has been mitigated through the use of short lengths of highly nonlinear bismuth-oxide doped fibers. In the case of thin film nonlinear PSAs, they may be deposited on conventional substrates, but also may be contemplated to be integrated with other planar optical elements, thereby making more complex functions possible.

Three key factors make this approach very promising.

A first factor is the resonant narrow-band phase-sensitive gain medium combined with dispersion management techniques.

A second factor is the chalcogenide platform. These glasses have been studied previously for their nonlinear properties, which are many times larger than in silicon or silica.

A third factor is the integration of glass platform with silicon photonics or other integrated optics technology such as silica on silicon. Coupling the high precision capabilities of more mature Silicon photonics technology with the nonlinear behavior of the glass platform offers the opportunity to reduce the loss of the system by eliminating lossy on-and-off-chip optical interfaces and can significantly increase performance.

To operate in a phase sensitive manner, both signal and its conjugate, the idler, must be present at the input of the PSA. This can be practically achieved quite simply through the double sidebands of the phase modulated signals. Such a PSA has been demonstrated previously in fiber.

Figure 8:
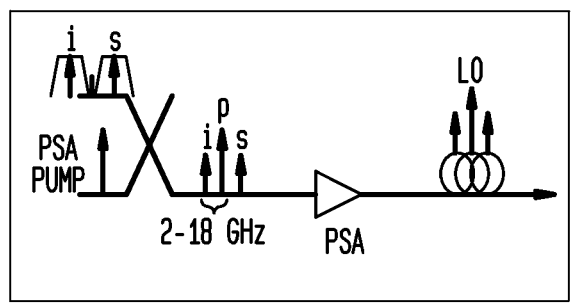
FIG. 8 shows PSA configuration.

In the inventive system configuration embodiment shown in FIG. 8, the signal and idler are created from the double sidebands of the phase modulated signal with the carrier filtered out. They are offset 0.1-20 GHz from the carrier depending on the frequency band of operation. The pump obtained from the same laser source as the signal and idler is at the carrier frequency and is combined with the signal and idler with the optimum phase relationship before the PSA. After the PSA, the remaining pump is transmitted along with the amplified signal and idler and reused as the local oscillator for coherent detection at the receiver. This provides significant power efficiency in the link thus contributing to meeting the RFOM metrics.

Ignoring optical loss and pump depletion, the optical power gain of a PSA is given by $$G = 1 + \left\{ 1 + \frac{4\gamma^2 P_p^2 + \kappa^2 + 4\gamma P_p \kappa \cos(\theta)}{4g^2} \right\} \sin^2(gL) + \frac{\gamma P_p \sin(\theta)}{g} \sinh(2gL)$$

where $\kappa = \Delta\beta + 2\gamma P_p$ is the phase mismatch, $\Delta\beta = \beta_s + \beta_i - 2\beta_p$ is the linear phase mismatch between signal, idler and pump ($\beta_s$, $\beta_i$, $\beta_p$ are the respective propagation constants), $\gamma$ is the nonlinear coefficient, $g = [(\gamma P_p)^2 - (\kappa/2)^2]^{1/2}$ and $\theta = \phi_s + \phi_i - 2\phi_p$ the relative phase difference between pump, signal, and idler at the input of the PSA. Resonant effects are not included in this equation. For perfect phase-matching ($\kappa = 0$), the maximum gain is obtained for $\theta = \pi/2$ (in-phase gain) and $G_{max} = \exp(2\gamma P_p L)$.

For $\kappa \neq 0$, such that $\kappa = 2\gamma P_p$ (i.e., $\Delta\beta = 0$) and $\theta = \pi/2$, the gain grows only quadratically with $\gamma PL$ and the gain in this case is $G^{\kappa \neq 0} = 1 + 2\gamma P_p L + 2(\gamma P_p L)^2$.

Figure 9:
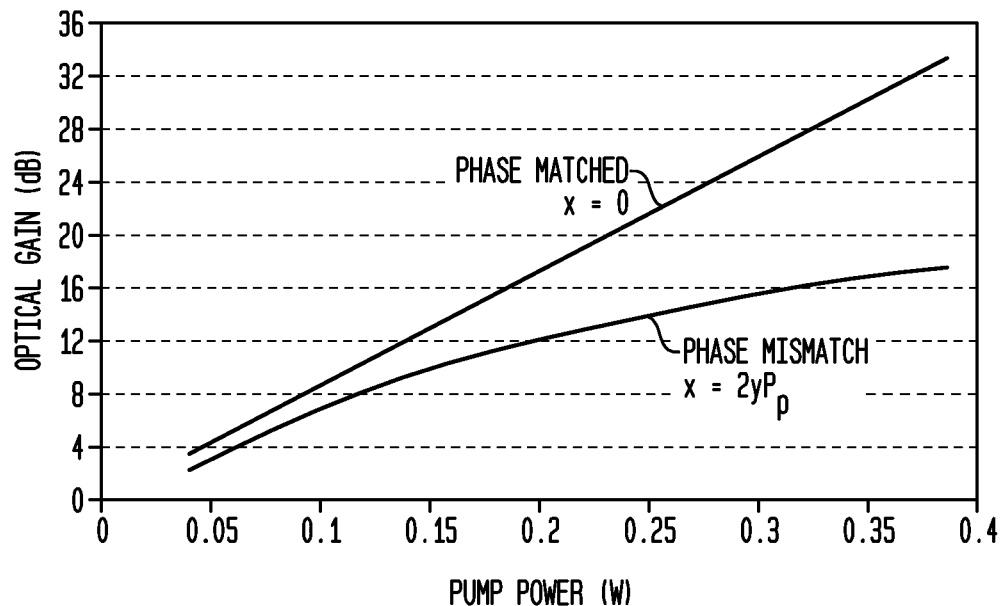
FIG. 9 shows optical power gain as a function of (left) pump power and (right) relative input phase difference, for perfect phase matching and phase mismatched cases.
Figure 9:
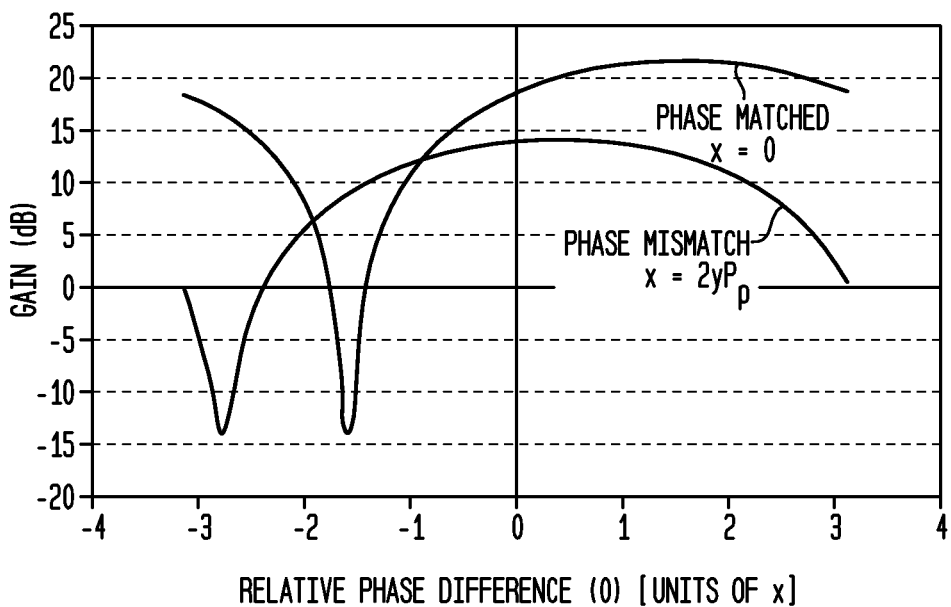

FIG. 9 shows simulation of optical power gain as a function of the pump power for a fixed $\gamma L = 10$ W$^{-1}$ and optimum input phase condition $\kappa = \pi/2$, under the phase matched and phase mismatched conditions, described above. An optical gain of 15 dB is possible even when phase mismatch exists for pump power levels of 0.25 W. With perfect phase-matching, 22 dB of gain is obtained. FIG. 9 shows the optical power gain as a function of the relative input phase difference ($\theta$) for a fixed $\gamma L = 10$ W$^{-1}$ and fixed pump power $P_p = 0.25$ W. For the phase-matched case, maximum power gain is obtained for $\theta = \pi/2$ and the minimum gain (deamplification) is obtained for $\theta = -\pi/2$, illustrating the phase-sensitive nature. In the phase mismatched case, the optimum value of $\theta$ is different from the phase-matched case. The phase relationship between the pump and the signal/idler determines the optical gain and will be controlled actively. Furthermore, the optical gain does not change significantly as the offset between the pump and the signal/idler is changed from 0.1 to 20 GHz.

For $\kappa = 0$, $2\gamma P = -\Delta\beta$. For perfect phase-matching, the linear phase mismatch $\Delta\beta$ has to cancel the nonlinear phase shift due to self-phase modulation (SPM) on the pump ($2\gamma P_p$). This condition implies that the net dispersion in the nonlinear material needs to be in the anomalous regime. Also, to prevent walk-off, it is advantageous to operate close to the zero dispersion. $\Delta\beta$ is insignificant for the frequency range 0.1-20 GHz and hence dispersion tailoring will be employed to meet the phase-matching conditions.

For PSA's in straight waveguides, very large input powers are needed to attain large phase sensitive gains of 20 dB or more. The pump field can be resonantly enhanced using an integrated ring resonator. This will permit an ultra-low noise integrated resonant phase sensitive amplifier to be realized in chalcogenide waveguides. Such an amplifier is highly desirable to enhance the noise figure, MDS, and RFOM metrics required of advanced applications.

Figure 10:
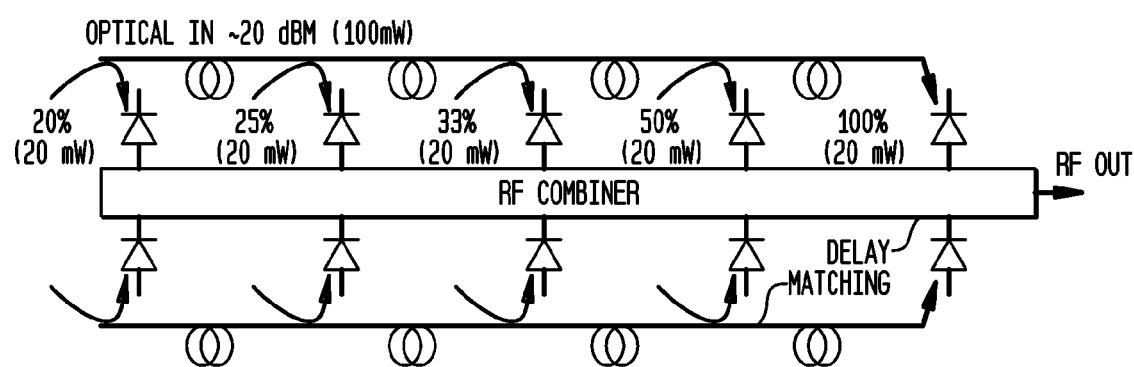
FIG. 10 shows a schematic concept of Distributed Optical Low-Loss RF (DOLLR) Converter.

To minimize noise, a direct optical-to-RF conversion can be used as the final stage of the receive signal path, without use of an electronic amplifier. Optical power levels in the 20-30 dBm range are anticipated. To increase flexibility and relieve design burdens on individual photodiodes, a DOLLR converter based on the waveguide-fed collection of diodes can be realized, as conceptually illustrated in FIG. 10. The DOLLR realization will significantly reduce risk of designing individual high-current photodiode, and provide a new and valuable scaling mechanism for both receive and transmit subsystems.

Individual photodiodes of the DOLLR array can be backside illuminated normal incidence detectors realized in a planar InP detector process.

Figure 11:
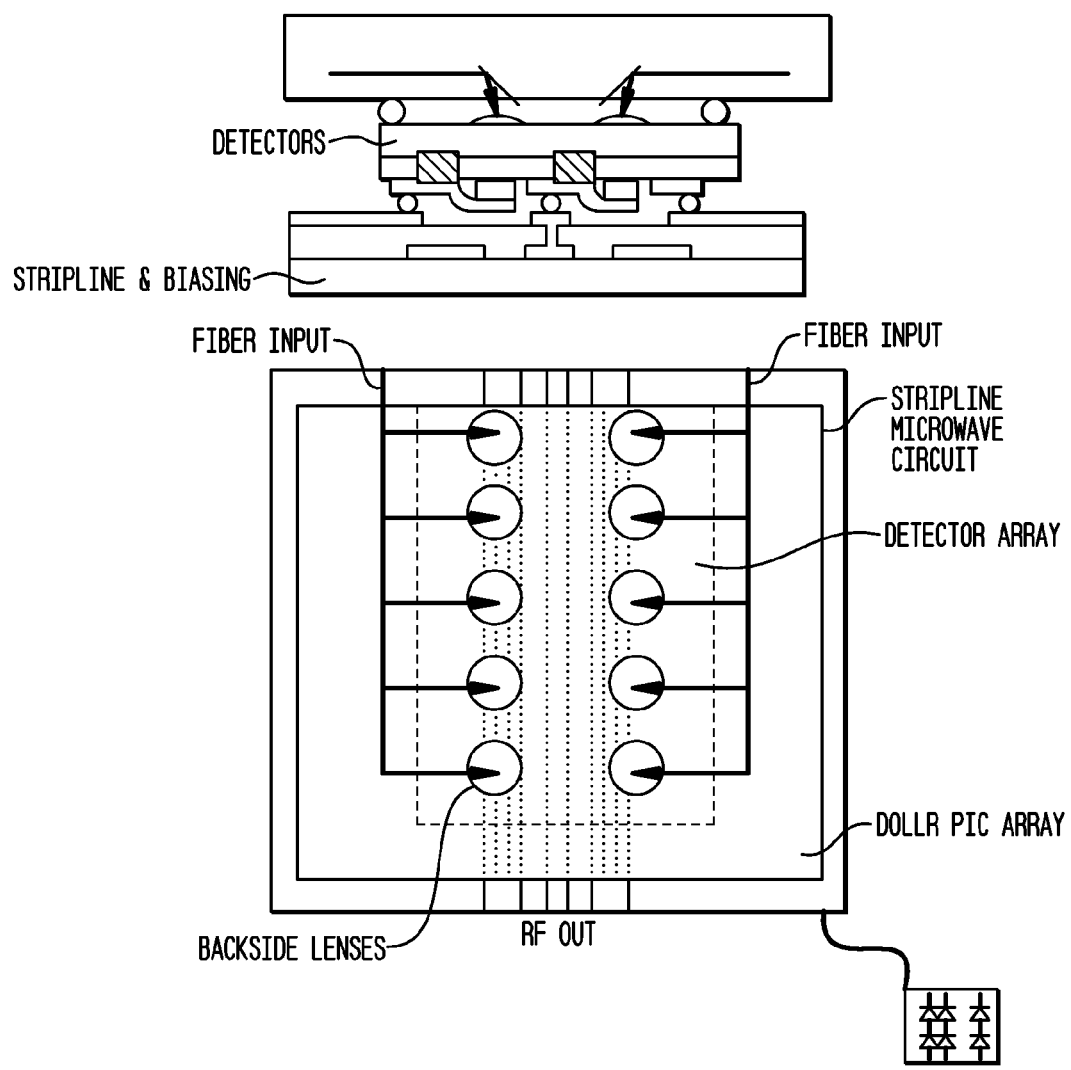
FIG. 11 shows conceptual illustration of a DOLLR assembly utilizing front- and back-side access.

DOLLR Array Configuration is further described. Photodiodes will be clustered for current gain to the limit of breakdown voltage. This is the most efficient source of power gain. Power combiners will be used beyond this point, providing linear power scaling. Several concepts for assembling balanced detectors are possible. For example, one can take advantage of backside access to optimize the assembly (see FIG. 11 for an example). Clustering diodes in arrays can be done in a traveling wave configuration as illustrated conceptually in FIG. 10, or may also be realized using matching networks in which impedance transformation can be effected for each individual diode based on the optimum breakdown and/or current characteristics of the devices. Matching networks will be designed based on measured device characteristics. Preliminary results indicate that multi-section quarter-wave transformers will be suitable.

A photonic integrated circuit element, e.g., DOLLR PIC, is required to deliver optical signal to the detector array. In one embodiment, this can be constructed in Silicon Photonics, although a variety of PIC technologies are possible.

This section describes the FORTE transmitter and demonstrates how one achieves the FORTE transmitter objectives. Whereas the receiver was optimized for small-signal response with modest output (−40 to +28 dBm), the transmitter has a similar topology but is optimized for large-signal response at an output power of +42 dBm (+37 dBm initially) and has a 35 dBm Er:Yb cladding pumped high power optical amplifier. The input stage employs the same FECPM electro-optic phase modulation with optical filtering to remove residual carrier and higher order sideband, as in the receiver. The desired filtered sidebands are combined with $P_L = 5$ mW optical LO power in a 50:50 coupler. The "complementary" signals from the coupler are amplified with two EYDFA to a moderate power (+30 to +35 dBm) and converted to RF using coherent detection in a balanced receiver that provides 26-32 dB of power gain. The EYDFA amplifies the small RF signal and "restores" the LO power to 0.3-1 W. High RF output power is achieved with high linearity using an array of DOLLR photodetectors described earlier. The power from each DOLLR element is combined using a corporate combiner (2-6 GHz band) or quadrature combiner (6-18 GHz) to produce the desired 5-15 W output. FORTE exploits the ~50% conversion efficiency of a class A output stage to overcome the 6-12% power efficiency of the EDFA. Efficiency is further improved by optimal impedance matching in the DOLLR elements.

Based on the previous analysis for propagating a quadrature passband signal through FORTE, the total signal current produced by balanced coherent detection can be expressed as $\Theta i_{pd} = 4\eta G_{EDFA} \sqrt{P_S P_L} J_1(\pi\rho/V_\pi) \sin(\omega_c t + \theta)$. The inherent non-linearity posed by $J_1(\pi\rho/V_\pi)$ can be suppressed by attenuating the drive voltage $\rho(t)$. Full modulation depth is subsequently restored by increasing $P_S$. The corresponding DC photocurrent through the series-coupled detectors is $$\sum I_{pd} = \eta G_{EDFA}\left(\frac{1}{2}P_L + J_1^2(\pi\rho/V_\pi)P_S\right)$$

and is set by the LO power $P_L$ when second order distortion is small. The power gain seen at the photodetector array output can be expressed as a product of element gains: $G_{PD} \cdot G_{EDFA} \cdot G_{MOD}$. The modulator E-O conversion gain is $$G_{MOD} = \frac{1}{4}\pi^2 P_S R_S / V_\pi^2$$

where the input impedance is $R_S$. $G_{MOD}$=1.0 (0 B) with $P_S$=50 mW and $V_\pi$=2.5V can be achieved. The coherent conversion gain in the balanced photodiode array is $G_{PD}=16\eta^2 G_{EDFA} P_L \hat{R}_L \approx 32\eta \Sigma I_{pd} \hat{R}_L$ where the load impedance seen by each photodetector is $\hat{R}_L$. This provides 26 dB of power gain with a quiescent photocurrent of 250 mA and $\hat{R}_L$=50Ω. The voltage swing across the individual DOLLR elements is reduced by passively combining the power from four DOLLR elements.

Table 5 presents predicted transmitter performance for two output power levels (5 W and 15 W).

TABLE 5

| Band (GHz) | Vπ η$_s$/η$_{DC}$ | Low Power (5 W) | | | High Power (15 W) | | |
|---|---|---|---|---|---|---|---|
| | | OIP2 (dBm) | OIP3 (dBm) | Pdc (W) | OIP2 (dBm) | OIP3 (dBm) | Pdc (W) |
| 2 | 2.5 | 75 | 60 | 24 | 85 | 68 | 75 |
| | 1.0 | (70) | (56) | (30) | (80) | (65) | (75) |
| 6 | 2.7 | 75 | 60 | 24 | 84.6 | 68 | 81 |
| | 0.96 | | | (33) | | | (82) |
| 10 | 3.1 | 74 | 59 | 24.4 | 84 | 67 | 83 |
| | 0.89 | | | (37) | | | (91) |
| 14 | 3.5 | 73 | 58 | 25 | 83 | 66 | 87 |
| | 0.82 | | | (41) | | | (99) |
| 18 | 4.1 | 72 | 57 | 26 | 82 | 65 | 91 |
| | 0.74 | | | (46) | | | (110) |

In the quiescent state, each EDFA delivers $\frac{1}{2}G_{EDFA}P_L$=0.31 W–1 W to the photodetector array in initial phases, and latter phases, respectively. This determines the maximum current swing across the load impedance $\hat{R}_L$ and therefore the maximum RF power $$P_{RF} \leq \frac{1}{2}\eta^2(G_{EDFA}P_L)^2 \hat{R}_L = 6.2\text{-}18.6 \text{ W for } \hat{R}_L = 50 \text{ }\Omega.$$

The EDFA power is significantly reduced by matching the photodetectors into a moderate impedance load. The corresponding power dissipation in the output stage is $P_{RF} > \eta^2 (G_{EDFA} P_L)^2 \hat{R}_L$=12 W and 56 W for initial and latter phases respectively.

The maximum usable output power is limited by envelope distortion, which the FECPM can address. The inherent phase modulation non-linearity is suppressed using low drive voltage and high $P_S$=50 mW in the signal path. The EDFA and photodetector also exhibit saturation, which creates envelope distortion. All of these effects can be mitigated using FECPM with pre-distortion using gain modulation in the LO path. It is worth noting that envelope compensation has become ubiquitous in radio transmitters. The compensation signal is derived from the input signal using a square law detector and baseband filter, as described for the receiver.

The implementation of predistortion compensation in the receiver was limited by noise and power constraints. Here envelope compensation is fully exploited to overcome EDFA and photodetector limitations. This can be accomplished with two phase-gain branches in the feedforward path, thereby allowing a maximum modulation depth of 80%. As a protective measure, the envelope signal is also used to rapidly reduce the EDFA power in case of input overload and thereby protect the detector array from damage.

The two dominant sources of second order intermodulation are carrier leakage given by $4\zeta\sqrt{P_S P_L} J_0(\pi\rho/V_\pi)$, and gain mismatch in the output optical path that creates residual signal-signal beating $4\epsilon P_S J_1^2(\pi\rho/V_\pi)$, as described above for the receiver. Carrier leakage is substantially suppressed by optical filtering (30-40 dB) and also by the use of a dual-arm carrier-suppressed phase modulator (20-30 dB) at 2-6 GHz.

The transmitter was evaluated with computer simulation based on large signal models for filtered phase modulation using the frequency dependent modulator and photodetector "macro-models" described earlier. Saturation in the high power photodiodes and high power EDFA were treated assuming quadratic gain compression based on optical power. A gain tracking error of 0.2 dB was assumed for the envelope distortion compensation used to mitigate photodetector and EDFA non-linearity. As before, it is assumed that the input and output are matched to 50Ω source and load, respectively.

Figure 13:
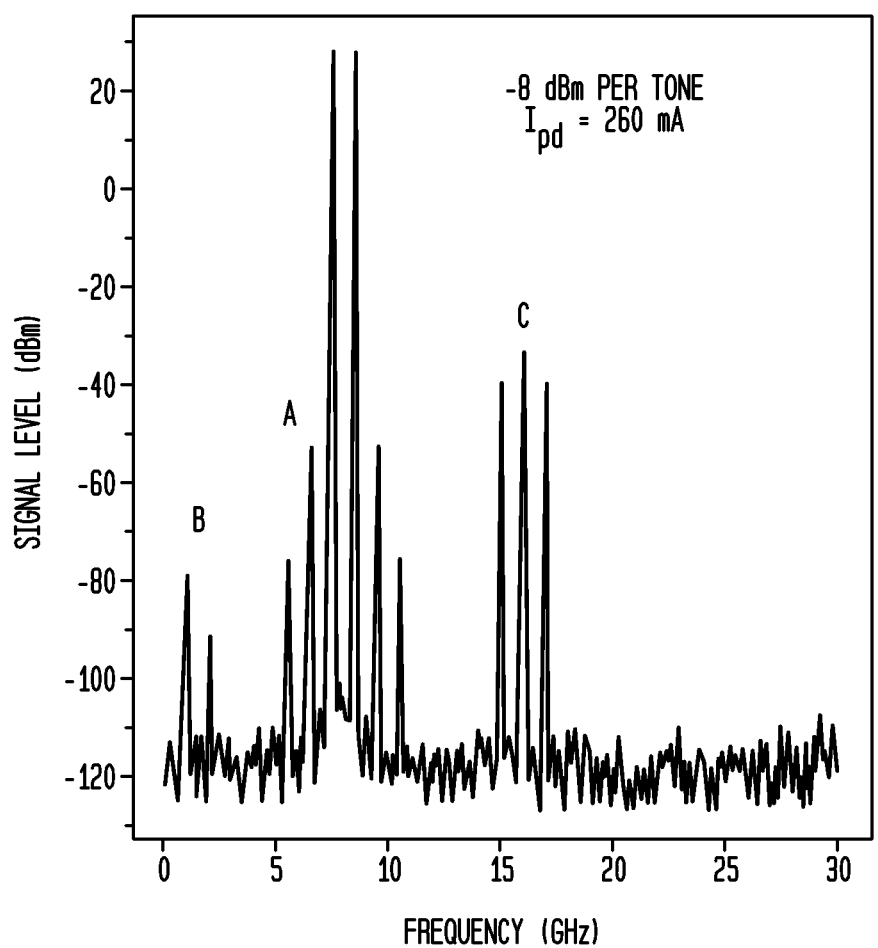
FIG. 13 shows a predicted transmitter response with two-tone test.

The predicted output spectrum for a two tone signal at 8 GHz with Δf=0.5 GHz is shown in FIG. 13 based on initial operation and component parameters. The third order intermodulation peaks at (A) arise from residual photodetector distortion. The second order products (B) and (C) are produced by carrier leakage and gain mismatch, respectively. OIP2 and OIP3 were calculated from a series of runs at different input signal levels using estimated device parameters for proposed implementations. The photodetectors are biased to 3V overhead. The EDFA efficiency is assumed to be 6%. The estimated power dissipation includes 3 W for pre-distortion and control circuits. The predicted performance is summarized in Table 5 which shows predicted performance for two output power levels (5 W and 15 W).

A 35 dBm Er:Yb cladding pumped high power amplifier that is commercially available can be used in the inventive system.

Figure 12:
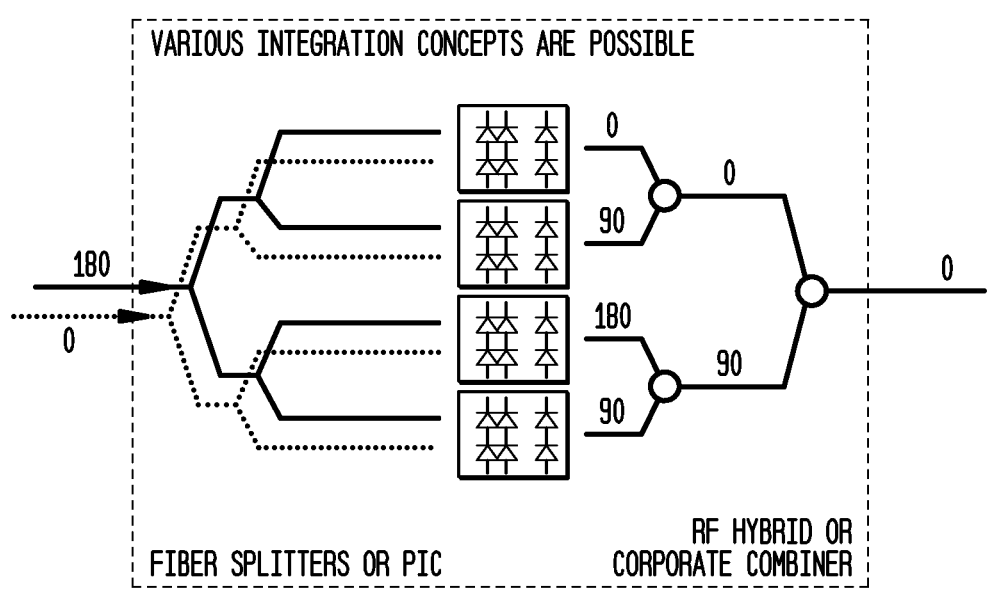
FIG. 12 shows a schematic illustration of the optical splitter, detector array elements and RF combiner.

The power handling and efficiency challenges of the transmit subsystem can be overcome through the use of arrays. With array systems, performance can be scaled with both component performance and array scaling. FIG. 12 presents a schematic DOLLR array structure in which coaxial combiner networks are employed. A more intimate packaging is possible when thermally-engineered hybrid assemblies are employed.

PIC Splitter and Delay management is described. To convert optical inputs differentially to RF output, proper phase alignment of the resulting signals is assured from the quadrature splitter. However, precise time delay is required to achieve high efficiency optical to RF conversion. Further, to operate hybrid combiners with low loss, RF phase alignment is required at the inputs to the combiner.

Three means of achieving these delays are possible.

One means of achieving these delays can be using a splitter array. While an integrated PIC device could be employed for this purpose, to save development cost, a precision fiber splitter, with lengths precisely adjusted, can be employed.

A second means of achieving these delays can be integrated DOLLR feed element delay tuning. On each DOLLR element, the ability to implement fine delay adjustment will be possible through thermal tuning of waveguide delay. Such tuning can be employed to compensate for small mismatches in delay through the preceding system.

A third means of achieving these delays can be coaxial delay. Phase adjustment for the operation of the hybrid combiner can be implemented by common mode optical fiber delay (possible in an ultimate integrated PIC splitter array), on individual RF lines feeding the combiners.

Because photo-diodes convert optical power to electrical current, optical to RE conversion is favorable at high optical power. However, space charge screening, voltage breakdown, impedance mismatch and thermal effects limit capacity. Incomplete absorption and series resistance also compromise performance at high current and operating frequency. Accordingly, arrays of distributed photodiodes (DOLLR configuration) permit efficient broadband RE power scaling. In one embodiment, the design can be optimized for impedance, operating bandwidth, breakdown voltage, and loss of the feed networks.

Figure 14:
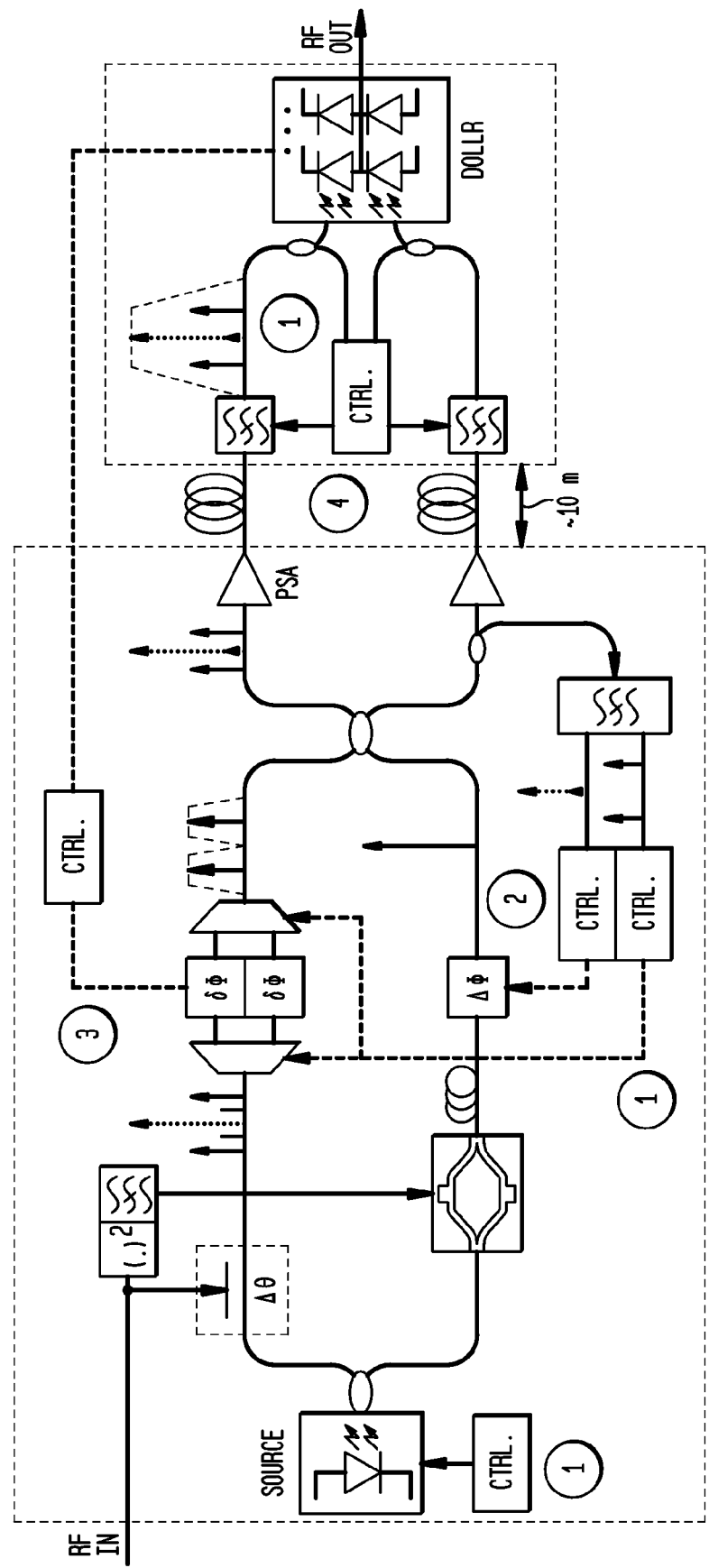
FIG. 14 is a block diagram of a receive subsystem with the control paths and associated elements identified.

Methods of control and stabilization of the FORTE system will now be described. To deliver high performance, it will be critical to integrate the individual subsystems into a stable, high-performance analog photonic link. The receive subsystem is shown in FIG. 14 with the critical control elements identified. With good design, closed-loop control methods at both system and subsystem level will achieve robust, long-lived and stable system operation. As depicted in FIG. 14, key elements for stabilization and control include the following.

Frequency Alignment: A high efficiency, frequency stabilized high-power laser provides a frequency-stable source of light at 1550 nm, using various well known methods. Additional components within the link that are spectrally aligned to the source include narrow-band filtering for implementing FECPM. Additional elements requiring frequency alignment include ASE filters following the link optical amplifiers. Small-signal, dither-locking techniques will be employed locally to actively center the optical filters, thereby ensuring minimal loss of the amplified signal and local oscillator signals.

Interferometric path stabilization: Given that the link uses coherent balanced detection of the amplified signal and a local oscillator, it is crucial to maintain a stable phase relationship between the two optical fields, which can be challenging without an entirely monolithic integrated photonic circuit. In the presence of environmentally-sensitive, fiber-interconnected elements, active control strategies will be needed for stable coherent detection. As shown in FIG. 14, the residual carrier power that remains after the FECPM narrow-band filtering can accomplish this task. The interference of the residual carrier and recombined unmodulated carrier serves as a monitoring signal for interferometric path stabilization. By impressing a small phase dither and employing narrow-band electrical lock-in detection techniques, one can maintain a stable phase relationship between the interferometric paths. Continuous local feedback to FECPM subsystem can be provided, thereby ensuring stable link performance during operation.

End-to-end link gain and noise optimization: An end-to-end link optimization step is necessary to ensure the optimal phase relationship is established between the filtered modulated signal sidebands and the local oscillator prior to amplification. The phase relationship will be controlled to maximize the gain given the cascaded combination of phase-sensitive amplification and coherent detection. In addition, this optimization step can include ensuring the optical power levels arriving at the photodiodes are appropriately balanced using optical attenuators, thereby providing maximal link gain and minimal noise. Unlike the fiber paths described previously, the elements involved in this optimization step are relatively stable with time and only periodic updates are needed over an out-of-band feedback control channel.

Management of polarization: Finally, polarization effects need to be considered given the use of coherent detection, phase-sensitive amplification, and polarization-sensitive elements. However, in one embodiment, by launching the local oscillator prior to amplification and link transmission, these effects can be simplified considerably. In particular, polarization-maintaining components can be effectively used to manage polarization prior to transmission, while polarization-insensitive components can be employed after the transmission link, obviating the need for any active control.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system comprising:
a modulator subsystem comprising a modulator, an optical filter, and a distortion compensating circuit,
the modulator to modulate a phase of an optical signal,
the distortion compensating circuit to compensate for quadratic distortion in one of the modulator or the optical filter,
the optical filter to extract upper and lower first order optical sidebands from the optical signal and suppress residual carrier; and
an optical phase sensitive amplifier to:
amplify the extracted upper and lower first order optical sidebands, and
send the amplified extracted upper and lower first order optical sidebands to an array of photodetectors, each photodetector comprising a plurality of pairs of diodes.

2. The system according to claim 1, wherein the optical phase sensitive amplifier is an erbium doped fiber amplifier.

3. The system according to claim 1, wherein optical power is delivered to each diode of the array of photodetectors via a photonic integrated circuit.

4. The system according to claim 1, wherein the optical signal is amplified using the optical phase sensitive amplifier pumped by a local oscillator creating a difference between optical signal gain and noise gain.

5. The system according to claim 4, wherein the optical phase sensitive amplifier is an optical resonant phase sensitive amplifier.

6. The system according to claim 1, wherein an optical controller system is implemented to stabilize interferometric path variations between local oscillator and signal paths.

7. The system according to claim 1, wherein optical filters are aligned using a small signal dither locking technique to stabilize to a known optical signal.

8. A method comprising:
modulating a phase on an optical signal;
compensating for quadratic distortion in one of a modulator or an optical filter;
extracting upper and lower first order optical sidebands from the optical signal and suppressing residual carrier, using an optical filter;
amplifying, by an optical phase sensitive amplifier, the extracted upper and lower first order optical sidebands; and
sending the amplified extracted upper and lower first order optical sidebands to an array of photodetectors, each photodetector comprising a plurality of pairs of diodes.

9. The method according to claim 8, wherein the optical phase sensitive amplifier is an erbium doped fiber amplifier.

10. The method according to claim 8, further comprising delivering optical power to each diode of the array of photodetectors via a photonic integrated circuit.

11. The method according to claim 8, wherein amplifying is performed using the optical phase sensitive amplifier pumped by a local oscillator creating a difference between optical signal gain and noise gain.

12. The method according to claim 11, wherein the optical phase sensitive amplifier is an optical resonant phase sensitive amplifiers.

13. The method according to claim 8, wherein an optical controller system is implemented to stabilize interferometric path variations between local oscillator and signal paths.

14. The method according to claim 8, wherein optical filters are aligned using a small signal dither locking technique to stabilize to a known optical signal.

15. A system comprising:
a first optical signal used as a local oscillator for a coherent detection system;
a distortion compensating circuit; and
an optical phase sensitive amplifier, wherein the first optical signal is employed as a pump signal for the optical phase sensitive amplifier, and
wherein the optical phase sensitive amplifier controls a phase relationship between the first optical signal employed as a pump signal and upper and lower first order optical sidebands extracted from a second optical signal, and
wherein the distortion compensating circuit compensates for quadratic distortion in the optical phase sensitive amplifier.

* * * * *